(12) United States Patent
Suzuki

(10) Patent No.: US 6,209,410 B1
(45) Date of Patent: Apr. 3, 2001

(54) SHIFT LEVER APPARATUS FOR AUTOMATIC TRANSMISSION WITH MANUAL TRANSMISSION MODE

(75) Inventor: Takayoshi Suzuki, Shizuoka (JP)

(73) Assignee: Fuji Kiko, Ltd., Kosai (JP)

( * ) Notice: Subject to any disclaimer, the term of this patent is extended or adjusted under 35 U.S.C. 154(b) by 0 days.

(21) Appl. No.: 09/429,726

(22) Filed: Oct. 29, 1999

(30) Foreign Application Priority Data

Oct. 30, 1998 (JP) .................................................. 10-310076

(51) Int. Cl.⁷ .................................................. F16H 55/17

(52) U.S. Cl. .................................................. 74/473.18

(58) Field of Search .......................................... 74/473–18

(56) References Cited

U.S. PATENT DOCUMENTS 5,870,929 * 2/1999 Bravo .................................. 74/473.18

* cited by examiner

*Primary Examiner*—Dirk Wright
(74) *Attorney, Agent, or Firm*—Foley & Lardner

(57) ABSTRACT

A shift lever apparatus of an automatic transmission with M/T mode includes a shift lever supported to a supporting shaft so that the shift lever is swingable in a right and left direction and a front and rear direction of a vehicle. A cable link lever connected to the automatic transmission is rotatably supported to the supporting shaft. A mechanism is installed between the shift lever and the cable link lever to swing the cable link lever on the center axis of the supporting shaft according to the right and left directional swing of the shift lever. This shift lever apparatus enables the shift lever to be moved from D position of the A/T mode to M/T mode without one setting at second gear position in M/T mode.

12 Claims, 5 Drawing Sheets

SHIFT LEVER APPARATUS FOR AUTOMATIC TRANSMISSION WITH MANUAL TRANSMISSION MODE

BACKGROUND OF THE INVENTION

The present invention relates to improvements in a shift lever apparatus of a vehicle, more particularly, to a shift lever apparatus of a transmission having an automatic transmission mode and an automatic transmission mode.

Recently, automatic transmission with a manual transmission mode has been practically installed to an automotive vehicle. A typical shift lever apparatus of such an automatic transmission is provided with an automatic transmission mode (A/T mode) and a manual transmission mode (M/T mode). The A/T mode includes parking gear (P), reverse gear (R), neutral gear (N), drive gear (D), second gear (2) and first gear (1) positions, and the M/T mode includes an upshift range (plus range) and a downshift range (minus range). A shift lever of such a shift lever apparatus is arranged to be swingable in a shift groove including an A/T mode shift groove, a M/T mode shift groove parallel with the A/T mode shift groove, and a lateral movement groove connecting the A/T mode shift groove and the M/T mode shift groove. Some kinds of transmissions are arranged to fix the gear position in the D position by laterally swinging the shift lever set at the D position through the lateral movement shift groove to the M/T mode shift groove. Further, by swinging the shift lever in the M/T mode shift groove along the front and rear direction, an upshift or a downshift is executed according to a frontward swing to a plus range or a rearward swing to a minus range.

SUMMARY OF THE INVENTION

However, such a transmission has been arranged to execute the change of the transmission mode only by means of a mode selector switch. Other types of transmissions have been arranged to execute the change of the transmission mode by moving a cable link lever from the D position to other position such as a second gear position, in addition to the operation of the mode selector switch. In such a type, the transmission mode is changed by swinging the shift lever from the D position to the second gear position along the front and rear direction of the vehicle and by laterally swinging the shift lever from the second gear position to the M/T mode shift groove. Therefore, if this conventional transmission is employed, it is necessary to execute two steps operations for achieving the change of the transmission mode from the A/T mode to the MIT mode.

It is an objection of the present invention to provide an improved shift lever apparatus which enables a shift lever to directly move from a D position of the A/T mode to the M/T mode without once setting at a second gear position.

A shift lever apparatus according to the present invention is for an automatic transmission having an automatic transmission mode and a manual transmission mode. The shift lever apparatus comprises a shift lever whose end is supported to a supporting shaft extending along a direction of a right and left direction of a vehicle. The supporting shaft is rotatable on its centre axis so that the shift lever is swingable in the right and left direction and a front and rear direction of the vehicle. A cable link lever is connected to the transmission and is swingably supported to the supporting shaft. The cable link lever is linked with the shift lever such that the cable link lever is swung on the centre axis of the supporting shaft according to the right and left directional swing of the shift lever.

BRIEF DESCRIPTION OF THE DRAWINGS

In the drawings, like reference numerals denote like parts and elements throughout all figures, in which.

DETAILED DESCRIPTION OF THE INVENTION

Hereinafter, with reference to drawings, embodiments of the present invention will be discussed.

Figure 1:
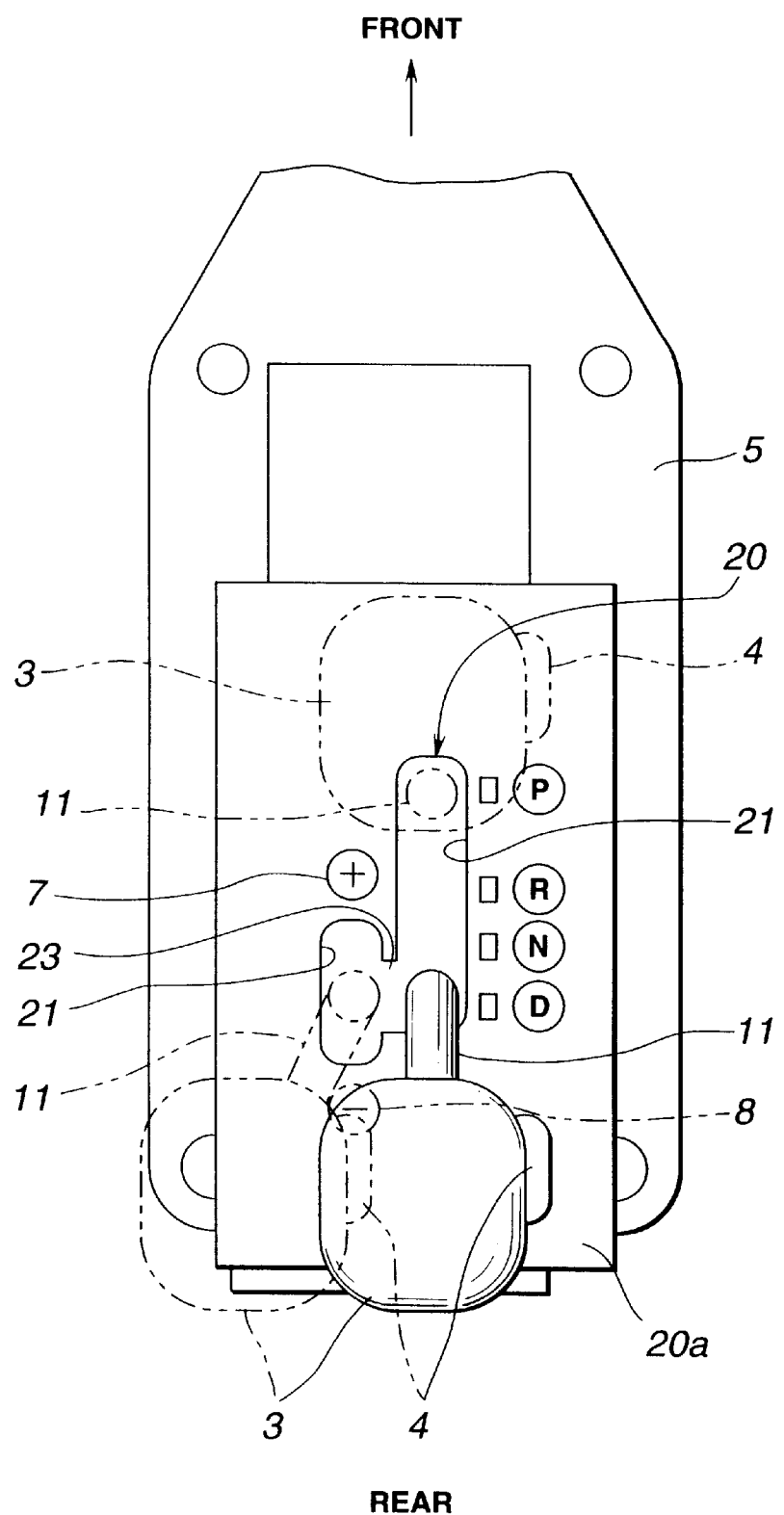
FIG. 1 is a top view showing a shift lever apparatus of a first embodiment according to the present invention.
Figure 2:
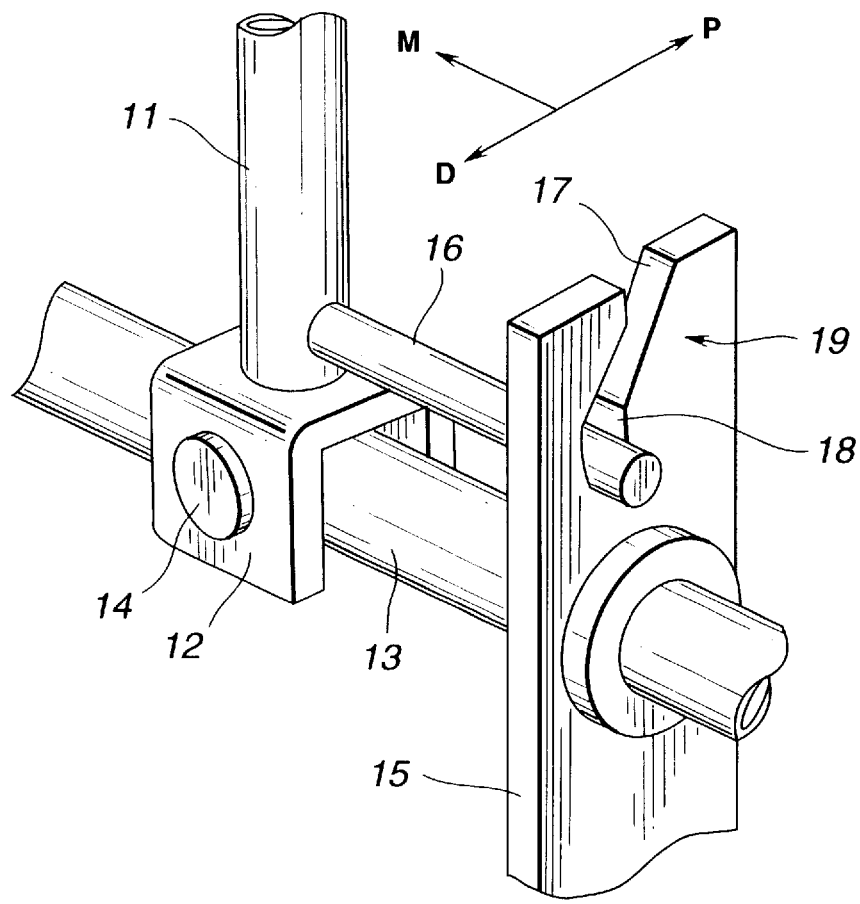
FIG. 2 is a perspective view of an essential part of the shift lever apparatus of the first embodiment.
Figure 3:
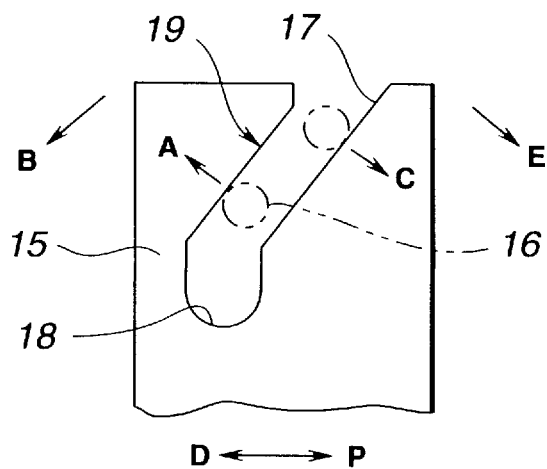
FIG. 3 is a partial side view showing operations of a branch lever in a groove of a cable link lever of the first embodiment according to the present invention.

Referring to FIGS. 1 to 3, there is shown a first embodiment of a shift lever apparatus according to the present invention. The shift lever apparatus is for an automatic transmission employed in an automotive vehicle.

As shown in FIG. 1, the shift lever apparatus according to the present invention is arranged to change a transmission mode from an automatic transmission mode (A/T mode) to a manual transmission mode (M/T mode) by tilting (swinging) a shift lever 11 set at a D (drive gear) position of an A/T mode shift groove 21 to a M/T mode shift groove 22. The shift lever apparatus comprises the shift elver 11 movable in a shift groove 20. The shift groove 20 comprises an A/T mode shift groove 21, a M/T mode shift groove 22 and a lateral shift groove 23 connecting A/T mode shift groove 21 and the M/T mode shift groove 22. The A/T mode shift groove 21 extends along a front and rear direction of the vehicle. The M/T mode shift groove 22 also extends along the front and rear direction of the vehicle so as to be parallel with the main groove 21a. The lateral groove 23 connects a rear end portion of the A/T mode shift groove 21 and an intermediate portion of the M/T mode shift groove 22. The combination of the A/T mode shift groove 21 and the lateral groove 23 generally forms L-shaped groove. Marks P, R, N and D, indicative of parking gear position, reverse gear position, neutral gear position and drive gear position, respectively, are marked on a right side portion of a shift groove defining plate 20a as shown in FIG. 1. Further, on the shift groove defining plate 20a, a plus range mark (+) 7 is marked in the vicinity of a front end of the M/T mode shift groove 22, and a minus range mark (−) 8 is marked in the vicinity of a rear end of the M/T mode shift groove 22. A shift knob 2 having a push button 4 is connected to a top end portion of the shift lever 11.

As shown in FIG. 2, a lower end portion of the shift lever 11 is fixed to a bracket 12 of a channel shape. The bracket 12 is swingably connected through a shaft pin 14 to a rotatable shaft 13 extending in a right and left direction of the vehicle. The rotatable shaft 13 is rotatablly supported to a support (not show) so that the shaft 13 is rotatable on a centre axis of the shaft 13. Therefore, the shift lever 11 is set so as to be swingable in the front and rear direction and in the right and left direction of the vehicle. On the other hand, a branch lever 16 is installed to the shift lever 11 near the bracket 12 so as to be perpendicular to the shift lever 11 and parallel with the shaft 13.

A cable link lever 15 is swingably installed to the shaft 13. A connecting groove 19 is formed at an upper end portion of the cable link lever 15. The other end portion of the cable link lever 15 is connected to the transmission through a shift cable (not show). The branch lever 16 extending from the shift lever 11 is arranged to be connected to and disconnected from the connecting groove 19 of the cable link lever 15 according to the lateral swing angle of the shift lever 11.

The connecting groove 19 of the cable link lever 15 is constituted by an inclined groove 17 inclined from an upright state in the frontward direction of the vehicle and a straight groove 18 connected to a lower end of the inclined groove 17 and extending downward as shown in FIG. 3.

With reference to FIGS. 2 and 3, manner of operation of the shift lever apparatus of the first embodiment will be discussed. More particularly, manner of operation during a mode selecting operation between the A/T mode and the M/T mode is discussed.

When the branch lever 16 is engaged with the straight groove 18, that is, when the transmission is operated in the A/T mode, the shift lever 11 and the cable link lever 15 are integrally swung in the front and rear direction of the vehicle. When the branch lever 16 is released from the straight groove 18, that is, when the transmission is operated in the M/T mode, the shift lever 11 is swingable in the front and rear direction of the vehicle independently from the cable link lever 15.

Further, the change of the transmission mode is executed by laterally swinging the shift lever 11 in the D position of the A/T mode in the direction of the arrow M shown in FIG. 2. By this lateral swing of the shift lever 11, the branch lever 16 is put out from the straight groove 18 and pushes the cable link lever 15 in the direction of the arrow A shown in FIG. 3. This pushing in the direction of the arrow A rotates the cable link lever 15 on an axis of the shaft 13 in the direction of the arrow B (anticlockwise direction) in FIG. 3. Therefore, a shift cable (not shown) is pulled so as to execute a shifting operation to the second gear position as same as a conventional apparatus does by two step operation. That is, by this cable pulling operation in the shift lever apparatus according to the present invention, an operation for changing the shift position into the second gear position is completed, and simultaneously a mode selector switch (not shown) is turned on to change the transmission mode from the A/T mode to the M/T mode.

When the transmission mode is changed from the M/T mode to the A/T mode, the shift lever 11 is set at a neutral position between the upshift position and the downshift position in the M/T mode shift groove 22 (the shift lever 11 is usually put at the neutral position, if the driver does not touch the shift lever 11 in the M/T mode shift groove 22), and the shift lever 11 is laterally moved through the lateral groove 23 from the M/T mode shift groove 22 to the A/T mode shift groove 21. By this lateral swing of the shift lever 11 to the A/T mode shift groove 21, the branch lever 16 slides along the inclined groove 19 while pushing a lower surface defining the inclined groove 19 in the direction of the arrow C in FIG. 3. This pushing of the branch lever 16 rotates the cable link lever 15 on the axis of the shaft 13 in the direction of the arrow E in FIG. 3 so as to return the shift lever in the D position of the A/T mode shift groove 21. Simultaneously, the mode selector switch is turned off to change the transmission mode from the M/T mode to the A/T mode.

Figure 4:
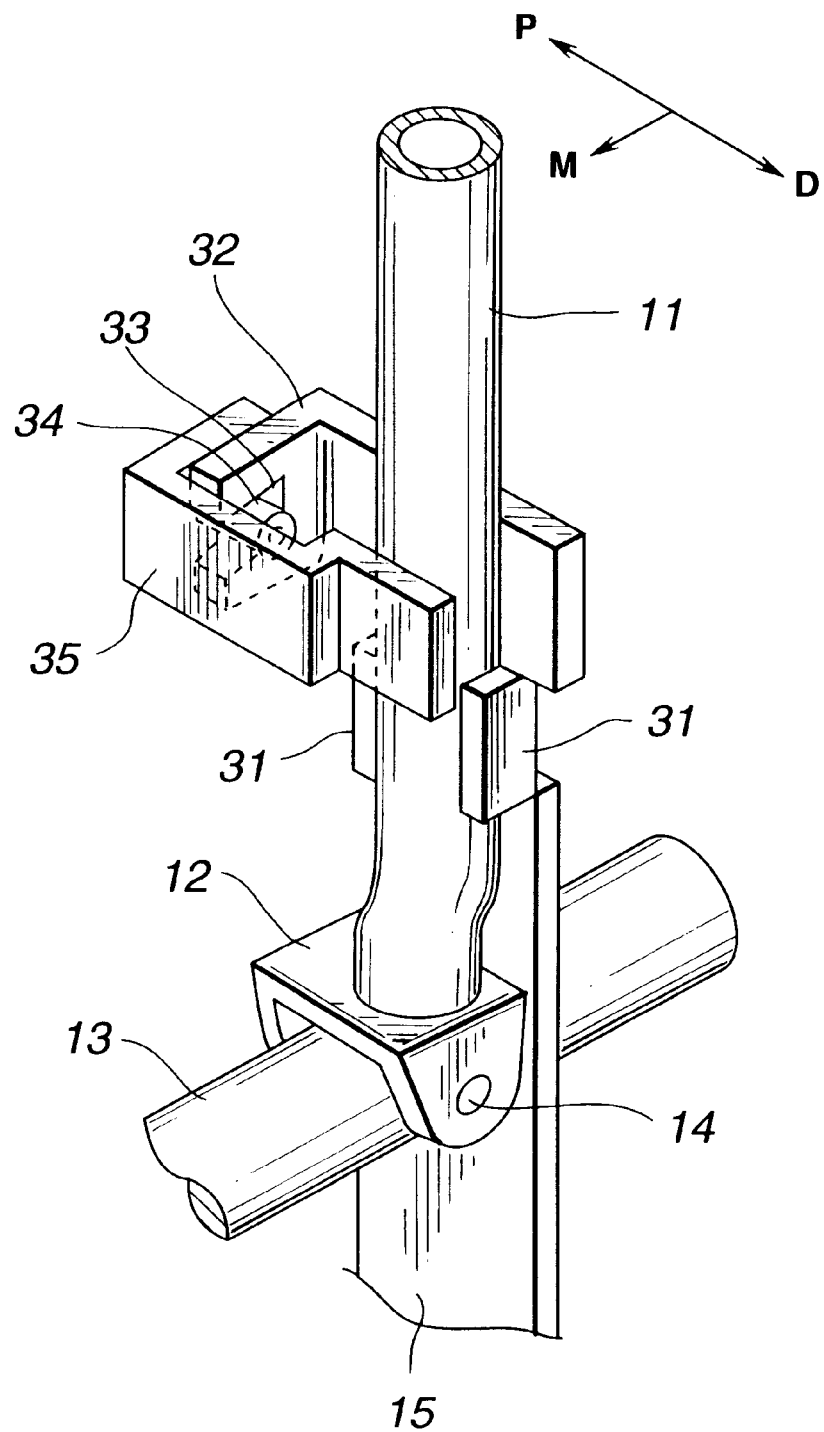
FIG. 4 is a perspective view of an essential part of the shift lever apparatus of a second embodiment according to the present invention.
Figure 5:
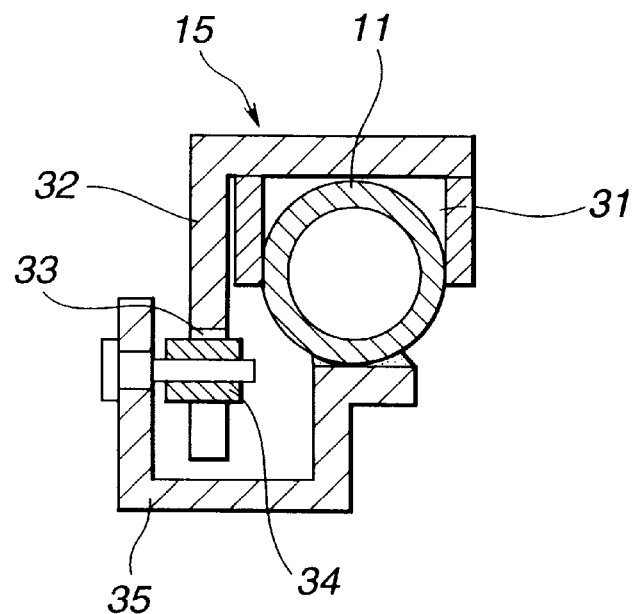
FIG. 5 is a cross sectional view of FIG. 4.

Referring to FIGS. 4 to 6, there is shown a second embodiment of the shift lever apparatus according to the present invention. The arrangement of a shift groove 20 and a shift lever 11 in the shift groove 20 is the same as that shown in FIG. 1 of the first embodiment. Therefore, the explanation of this arrangement shown in FIG. 1 will be omitted herein. A mechanism for swinging a cable link lever 15 in the front and rear direction of the vehicle according to the right and left directional swing of the shift lever 11 will be mainly discussed hereinafter.

Figure 6A:
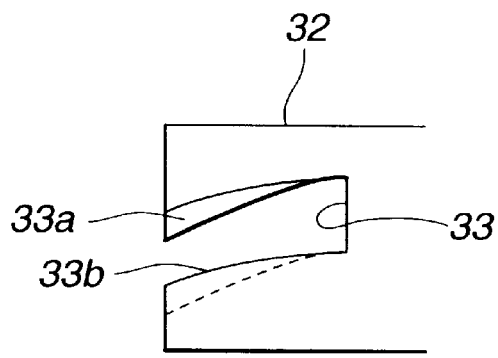
FIGS. 6A and 6B are partial views showing a shapes of a guide groove employed in the second embodiment of FIG. 4.
Figure 6B:
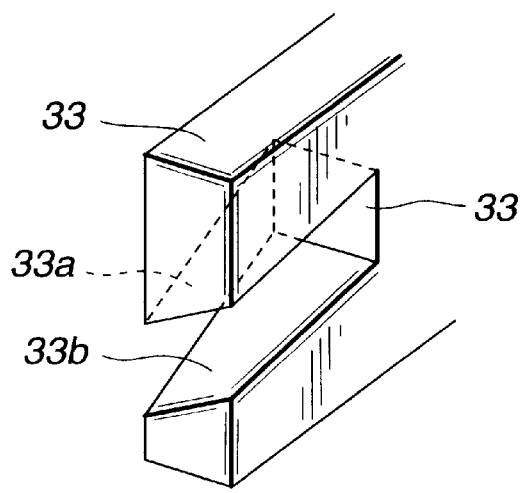

As shown in FIG. 4, a lower end of the shift lever 11 is fixed to a bracket 12. The bracket 12 is swingably connected to a rotatable shaft 13 through a shaft pin 14. Therefore, the shift lever 11 is swingable in the A/T mode groove 21 along the front and rear direction of the vehicle and is swingable in the D position of the A/T mode groove 21 and the lateral groove 23 along the right and left direction of the vehicle. A cable link lever 15 is swingably supported to the shaft 13 in the vicinity of the shift lever 11. The cable link lever 15 comprises a channel shaped holding portion 31 which supports the shift lever 11 in the front and rear direction of the vehicle and a L-shaped plate portion 32 formed at an upper portion of the cable link lever 15. A bent end portion of the plate portion 32 is parallel to the shaft 13. A cam groove 33 is formed at the plate portion 32 as shown in FIGS. 6A and 6B. The cam groove 33 has upper and lower inclined surfaces 33a and 33b, which are downwardly curved toward its opening and are inclined toward the front side of the vehicle from a horizontal state to an inclined state at which a front side is lower in height level than a rear side thereof. That is, the upper and lower inclined surfaces 33a and 33b are twisted as is clearly shown in FIGS. 6A and 6B.

A roller 34 is installed to the shift lever 11 through a bracket 35. The roller 34 is movably engaged with the cam groove 33 so that the roller 34 is slid on the inclined surfaces 33a and 33b of the cam groove 33 according to the lateral swing of the shift lever 11. More specifically, the roller 34 moves along the inclined surfaces 33a and 33b when the shift lever 11 is swung in the right and left direction of the vehicle, that is, when the change of the transmission mode is executed. This movement of the roller 34 in the cam groove 33 swings the cable link lever 15 by a twisted angle of the plate portion 32 according to the sliding amount of the roller 34 on the inclined surfaces 33a and 33b.

That is, when the shift lever 11 set at the D position in the A/T mode is swung laterally in the left direction of FIG. 1 to change the transmission mode from the A/T mode to the M/T mode, the shift lever 11 is swung with respect to the shaft pin 14 to be released from the holding portion 31 of the cable link lever 15. Further, the roller 34 moves in the cam groove 33 so as to push the upper inclined surface 33a of the cam groove 33 upwardly. By this operation, the cable link lever 15 is rotated on the axis of the shaft 13 in the direction of the arrow D shown in FIG. 4, and therefore the transmission mode is changed from the A/T mode to the M/T mode.

Figure 7:
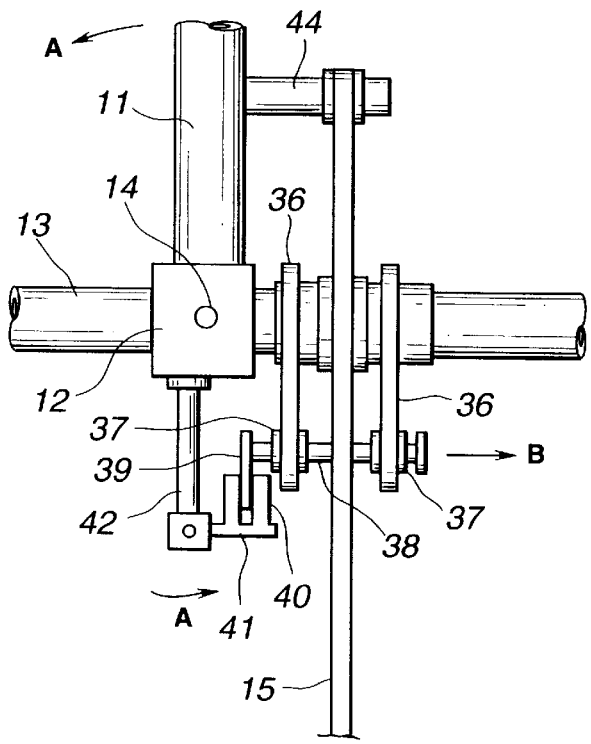
FIG. 7 is a partial side view showing the shift lever apparatus of a third embodiment according to the present invention.
Figure 8:
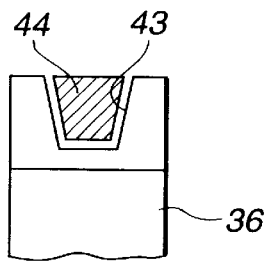
FIG. 8 is a partial cross-sectional view of a cable link lever and a branch lever of FIG. 7.
Figure 9:
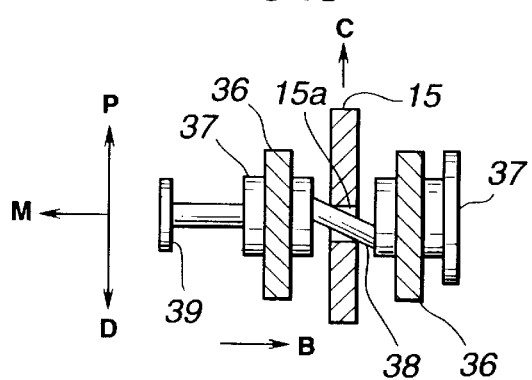
FIG. 9 is a cross sectional view showing an essential part of FIG. 7.

Referring to FIGS. 7 to 9, there is shown a third embodiment of the shift lever apparatus according to the present invention. The arrangement of a shift groove 20 and a shift lever 11 in the shift groove 20 is the same as that shown in FIG. 1 of the first embodiment, and therefore the explanation thereof will be omitted herein. A mechanism for swinging a cable link lever 15 in the front and rear direction of the vehicle according to the right and left directional swing of the shift lever 11 will be mainly discussed hereinafter.

As shown in FIG. 7, a lower end of the shift lever 11 is fixed to a bracket 12. The bracket 12 is swingably connected to a rotatable shaft 13 through a shaft pin 14. Therefore, the shift lever 11 is swingable in the A/T mode groove 21 along the front and rear direction of the vehicle and is swingable in the lateral groove 23 along the right and left direction of the vehicle as same as the arrangements in the first and second embodiments.

A cable link lever 15 is swingably supported to the shaft 13. Pair of levers 36 and 36 are installed to the shaft 13 so as to be swingable with the cable link lever 15 while being located both sides of the cable link lever 15, respectively. The levers 36 and 36 are loosely connected to the shaft 13 so as to be movable in the axial direction of the shaft 13. At each lower end portion of each lever 36, a fixing member 37 is installed. A diagonal shaft 38 is inclinedly disposed between the pair of fixing members 37 and 37. The diagonal shaft 38 is connected to the fixing members 37 and 37 while penetrating a hole 15a of the cable connecting hole 15. As is clear from FIG. 9, the diagonal shaft 38 diagonally traverses the hole 15a on an imaginary horizontal surface including an axis of the diagonal shaft 38 while keeping its horizontal state.

A plate 39 is installed at an opposite end of the fixing member 37 located between the shift lever 11 and the cable link lever 15. A lever 42 is installed at a lower portion of the bracket 12 and extends downwardly as shown in FIG. 7. A selector lever 41 having a pair of arms 40 and 40 is installed at a lower end of the lever 42. The arms 40 and 40 are arranged so as to sandwich the plate 39 therebetween.

A generally channel-shaped recess 43 is formed at an upper end portion of the cable link lever 15. A branch lever 44 of a trapezoidal shape is integrally connected to the shift lever 11. The branch lever 44 extends from the shift lever 11 toward the recess 43 of the cable link lever 15, and its free end portion is received in the recess 43 of the cable link lever 15.

When the shift lever 11 is swung in the direction of the arrow A in FIG. 7 around the shaft pin 14, the branch lever 44 is released from the recess 43 so as to be released from the cable link lever 15. By this swing movement of the shift lever 11, the lever 42 and the selector lever 41 are also swung in the direction of the arrows A. Further, the plate 39 connected to the arm 40 is pushed toward the direction shown by the arrow B of FIG. 7. By this pushing operation, the diagonal shaft 38 pushes the cable link lever 15 in the direction of the arrow C in FIG. 9. More specifically, this pushing operation of the diagonal shaft 38 swings the cable link lever 15 to pull a shift cable (not shown) so as to change the gear position in the A/T mode to the second gear position. Therefore, the transmission mode is smoothly changed from the A/T mode to the M/T mode.

Since the operation for moving the shift lever 11 from the D position to the second gear position is automatically executed by the mechanical arrangement of the shift lever apparatus according to the present invention so as to enable the direct movement from the D position in the A/T mode groove 21 to the M/T mode groove 22, the transmission mode change operation from the A/T mode to the A/T mode is largely facilitated. This improves the operational feeling to drivers.

The entire contents of Japanese Patent Application No. 10-310076 filed on Oct. 30, 1998 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. A shift lever apparatus of a transmission for a vehicle, the transmission having an automatic transmission mode and a manual transmission mode, the shift lever apparatus comprising:

a shift lever;

a supporting shaft extending along a direction of a right and left direction of the vehicle, said supporting shaft being rotatable around a centre axis of said supporting shaft, said supporting shaft supporting an end of said shift lever so that said shift lever is swingable in a right and left direction and a front and rear direction of the vehicle;

a cable link lever connected to the transmission and swingably supported to said supporting shaft; and means for swinging said cable link lever on the centre axis of said supporting shaft according to the right and left directional swing of said shift lever.

2. A shift lever apparatus as claimed in claim 1, further comprising integral swing means for integrally swinging said shift lever and said cable link lever in the front and rear direction of the vehicle when said shift lever is set in the automatic transmission mode.

3. A shift lever apparatus as claimed in claim 1, wherein said swinging means includes a branch lever perpendicularly connected to said shift lever and a connecting groove provided in said cable link lever, the branch lever engaged with the connecting groove so as to swing the cable link lever in a front and lever direction of the vehicle when said shift lever is swung in the right and left direction.

4. A shift lever apparatus as claimed in claim 3, wherein the connecting groove includes an inclined groove and a straight groove, said cable link lever is swung on the axis of the supporting shaft when the branch lever pushes a surface defining the inclined groove according to the right and left directional swing of said shift lever.

5. A shift lever apparatus as claimed in claim 1, wherein said swinging means includes a roller installed to said shift lever and a cam groove formed at a plate integral with said cable link lever, the roller sliding in the cam groove when said shift lever is swung along the right and left direction of the vehicle, said cable link lever being swung along the front and rear direction of the vehicle when the roller slides in the cam groove.

6. A shift lever apparatus as claimed in claim 5, wherein the cam groove defined by upper and lower twisted surfaces which are downwardly curved toward an opening of the cam groove and are twisted so as to be gradually inclined according to approaching an opening end of the cam groove such that a front side of the cam groove becomes lower in height lever than the read side of the cam groove.

7. A shift lever apparatus as claimed in claim 1, wherein said swinging means includes a hole formed on said cable link lever and a diagonal shaft diagonally penetrating the hole, the diagonal shaft being linked with said shift lever, said cable link lever being swung in the front and rear direction of the vehicle when the diagonal shaft is moved in the hole of said cable link lever along the axis of the supporting shaft according to the right and left directional swing of the shift lever.

8. A shift lever apparatus as claimed in claim 1, further comprising a shift groove which includes an automatic transmission (A/T) mode groove, a manual transmission (M/T) mode groove parallel with the A/T mode groove and a lateral groove connecting the A/T mode groove and the M/T mode groove, the A/T mode groove and the M/T mode groove extending along a front and rear direction of the vehicle, the lateral groove extending in the right and left direction of the vehicle.

9. A shift lever apparatus as claimed in claim 2, wherein said integral swing means includes a branch lever perpendicularly extending from said shift lever and a groove provided in said cable link lever, the branch lever being engaged with the groove such that the said cable link lever is swung with said shift lever in the front and rear direction of the vehicle when said shift lever is set in the automatic transmission mode and when said shift lever is swung in the front and rear direction.

10. A shift lever apparatus as claimed in claim 1, wherein said integral swing means includes a channel shaped connecting portion of said cable link lever, the channel shaped connecting portion is engaged with said shift lever when said shift lever is set in the automatic transmission mode.

11. A shift lever apparatus as claimed in claim 1, wherein said shift lever is swung in the front and rear direction independently of said cable link lever when said shift lever is set in the manual transmission mode.

12. A shift lever apparatus of a transmission for a vehicle, the transmission having an automatic transmission mode (A/T mode) and a manual transmission mode (M/T mode), the shift lever apparatus comprising:

a shift groove comprising an A/T mode groove, a M/T mode groove parallel with the A/T mode groove and a lateral groove connecting the A/T mode groove and the M/T mode groove;

a shift lever swingable in said shift groove;

a supporting shaft extending along the lateral groove, said supporting shaft being rotatable around a centre axis of said supporting shaft, said supporting shaft supporting an end of said shift lever so that said shift lever is swingable along the A/T mode groove and the M/T mode groove;

a cable link lever connected to the transmission and rotatably supported to said supporting shaft; and means for swinging said cable link lever in a direction along the A/T mode groove when said shift lever is swung in the lateral groove.

* * * * *